United States Patent
Aumont et al.

[11] Patent Number: 6,082,823
[45] Date of Patent: Jul. 4, 2000

[54] BACKREST FRAMEWORK OF AN AUTOMOBILE VEHICLE SEAT

[75] Inventors: Jean-Claude Aumont, Etrechy; Patrick Daniel, Paris; Christophe Aufrere, Marcoussis, all of France

[73] Assignee: Betrand Faure Equipments S.A., Boulogne Cedex, France

[21] Appl. No.: 09/286,657

[22] Filed: Apr. 6, 1999

[30] Foreign Application Priority Data

Apr. 17, 1998 [FR] France .................................. 98 05058

[51] Int. Cl.[7] .................................. A47C 7/02; B60N 2/42
[52] U.S. Cl. .................................. 297/452.2; 297/452.18; 297/216.13; 297/483; 297/284.1
[58] Field of Search .......................... 297/452.2, 216.13, 297/483, 452.18, 284.1, 484

[56] References Cited

U.S. PATENT DOCUMENTS

| | | | |
|---|---|---|---|
| 4,040,660 | 8/1977 | Barecki | 297/216.13 |
| 4,626,028 | 12/1986 | Hatsutta et al. | 297/284.1 X |
| 4,804,226 | 2/1989 | Schmale | 297/216.13 |
| 4,889,389 | 12/1989 | White | 297/483 X |
| 5,058,953 | 10/1991 | Takagi et al. | 297/284.1 X |
| 5,123,706 | 6/1992 | Granzow et al. | 297/452.18 |
| 5,246,271 | 9/1993 | Boisset | 297/483 X |
| 5,253,924 | 10/1993 | Glance | 297/216.13 X |
| 5,310,247 | 5/1994 | Fujimori et al. | 297/483 X |
| 5,390,982 | 2/1995 | Johnson et al. | 297/483 X |
| 5,447,360 | 9/1995 | Hewko et al. | 297/216.13 X |
| 5,509,716 | 4/1996 | Kolena et al. | 297/216.13 |
| 5,516,195 | 5/1996 | Canteleux | 297/284.1 |
| 5,599,070 | 2/1997 | Pham et al. | 297/483 |
| 5,641,198 | 6/1997 | Steffens, Jr. | 297/483 X |
| 5,645,316 | 7/1997 | Aufrere et al. | 297/216.13 |
| 5,658,048 | 8/1997 | Nemoto | 297/410 |
| 5,658,051 | 8/1997 | Vega et al. | 297/483 |
| 5,681,081 | 10/1997 | Lindner et al. | 297/216.13 |
| 5,697,670 | 12/1997 | Husted et al. | 297/216.13 |
| 5,772,280 | 6/1998 | Massara | 297/216.13 X |
| 5,823,619 | 10/1998 | Heilig et al. | 297/216.13 X |
| 5,823,627 | 10/1998 | Viano et al. | 297/216.13 X |
| 5,836,648 | 11/1998 | Karschin et al. | 297/216.13 X |
| 5,851,055 | 12/1998 | Lewis | 297/216.13 X |
| 5,927,804 | 7/1999 | Cuevas | 297/216.13 X |

FOREIGN PATENT DOCUMENTS

| | | |
|---|---|---|
| 0 511 100 | 10/1992 | European Pat. Off. . |
| 0 661 190 | 7/1995 | European Pat. Off. . |
| 29 52 064 | 6/1981 | Germany . |
| 36 13 830 | 10/1987 | Germany . |
| 195 01 087 | 7/1996 | Germany . |
| 196 52 939 | 1/1998 | Germany . |
| WO 97/30865 | 8/1997 | WIPO . |

*Primary Examiner*—Jose V. Chen
*Assistant Examiner*—Rodney B. White
*Attorney, Agent, or Firm*—Pollock, Vande Sande & Amernick

[57] ABSTRACT

A vehicle seat frame assembly includes two lateral upright side members and a brace connected between the upright side members to form a lower backrest frame. At least one of the upright side members has an upper end and it is rigid from a bottom of the lower backrest frame to the upper end, the upper end further including a point for attaching or passing a seat belt. An upper backrest frame is located above the lower backrest frame and is positioned below the upper end of the at least one upright side member. A hinge is provided for mounting the upper backrest frame at a lower edge thereof to the upright side members for allowing pivotal movement of the upper backrest frame relative to the lower backrest frame.

7 Claims, 3 Drawing Sheets

BACKREST FRAMEWORK OF AN AUTOMOBILE VEHICLE SEAT

FIELD OF THE INVENTION

This invention concerns a backrest framework for an automobile vehicle seat more especially for seats generally known as "incorporated belt seats" where the upper attachment point of the seat belt is on the seat itself.

BACKGROUND OF THE INVENTION

Still conventionally today, in many car models, the upper seat belt attachment point is located on the structure of the car, generally on a door post for the front seats. As the longitudinal position of these seats is classically adjustable, that is in the front-rear direction, the position of the belt is not always suitable to the morphology of the user and selected seat position because the relative positioning of the belt anchoring point in relation to the seat varies according to the longitudinal position of the seat in the car.

This is why so-called "incorporated belt" seats are being developed which incorporate the seat belt into their structures so that the relative position in relation to the seat is independent of the position of the seat in the car. Also note that this principle can be advantageously used for the removable seats used in people-carrier type vehicles, ie monospace cars.

The 3-point type incorporated seat belt is conventionally attached to the seat by two lower attachment points, located on either side of the seat, towards the rear of the seat pan, and an attachment point located at the top of the backrest, on one side. Normally, this attachment point is in fact used to change the direction of the belt the end of which is connected to a self-winding reel housed either in the backrest itself or in the seat pan. For harness-type seat belts, there are two upper attachment points located at the top and on either side of the backrest. In seats with incorporated belts, a major concern is to ensure the resistance of the seat backrest to the high loads which may result from the tensile forces exerted by the belt on the top of the backrest during a shock or a strong deceleration of the vehicle. For this, at least one of the lateral uprights of the backrest framework, that is the one supporting the upper attachment point of the belt, consists of a beam or post the mechanical strength of which is designed to take the bending loads generated by the tensile forces exerted on the belt. If the vehicle is involved in an accident, these loads can be very high. To enable the use of a seat with two upper attachment points, or simply to ensure seat symmetry, enabling manufacturing costs to be limited, the two lateral uprights of the backrest can consist of such a beam with high mechanical strength.

The backrest framework is completed by structural elements, such as cross members or various supports, in particular elements supporting a headrest, connected to the two uprights of the backrest and intended to ensure the rigidity and lateral stability of the backrest as a whole.

Such a structure does not offer the possibility of adjusting the position of the upper section of the backrest, that is, the section located more or less level with and above the shoulders of the user. Indeed, such an adjustment, which requires a hinge between the lower section of the backrest framework and its upper section, would require the incorporation of such a hinge in the beam or beams forming the uprights of the framework. It can be easily understood that the use of such a hinge would be detrimental to the mechanical strength of the framework and therefore to the safety provided by the belt as the upper attachment point of the belt would then necessarily be transferred to the hinged section so as to locate it, as required, more or less just above the shoulder of the user. In other words, such an arrangement would require that all the loads exerted by the belt on the top of the seat be passed via the said hinge and via the adjustment and locking mechanisms necessarily associated with it.

Also, to be able to supply, if applicable, seats of the same model but some equipped with the backrest top section adjustment and others not, it would be necessary, for manufacture, to use two sets of different tools, each set adapted to one of the two framework versions.

BRIEF DESCRIPTION OF THE INVENTION

The aim of this invention is to solve the problems above and more especially aims at providing incorporated belt seats including however the possibility of adjusting the top of the backrest and this without reducing the strength of the framework of the seat or its safety and also without complicating the manufacture or increasing costs.

With these targets in mind, the subject of this invention is a backrest framework of an automobile vehicle seat with an incorporated seat belt, including two lateral uprights, where at least one of the two uprights consists of a rigid beam the upper end of which is adapted to comprise an attachment or passage point for the seat belt, characterized in that it includes a frame forming a movable framework for the top of the adjustable backrest the said frame being located lower than the upper end of the said beam and installed so as to pivot, at its lower edge, between the said uprights.

The framework according to the invention conserves very good rigidity and mechanical strength for the upright to which the seat belt is connected, while offering the possibility of adjusting the top section of the backrest to improve the comfort of the seat. All the loads exerted by the upper strand of the belt are taken directly by the beam of the upright without transiting via the adjustable section of the top of the backrest or via any hinge mechanism.

According to a specific design, the second upright also consists of a rigid beam, an upper end of which can also be adapted to comprise a second point for attaching or passing the seat belt. Such an arrangement enables the manufacture of backrest frameworks which can be used indifferently for the seats located on the right or the left of the vehicle, that is with belt upper attachment points indifferently on the right or the left. Also, the beams used to make the two uprights can be identical or similar and therefore easier to manufacture and at lower costs.

According to a specific arrangement, the movable frame is shaped so that its center section can be housed between the two uprights and it has two lateral lugs located forward of the said uprights. This arrangement enables good integration of the upper section of the backrest into the backrest framework. The lateral lugs participate in laterally restraining the upper part of the trunk of the seat user and, by passing in front of the upright or uprights, guarantee that there is no risk of the said upper section of the backrest pivoting excessively towards the rear. This is especially advantageous as, preferably, the frame includes, on its upper edge, headrest supports intended to accommodate the pins conventionally used to hold and adjust the height of the headrest and it is therefore the frame which will take the loads exerted by the head of the passenger via the headrest.

According to another especially advantageous arrangement, the backrest framework includes hinge and positional adjustment means in relation to a seat pan framework and means for automatic adjustment of the position of the frame in relation to the backrest framework according to the inclination of the backrest in relation to the seat pan.

Other characteristics and advantages will appear in the description which will be given of a backrest framework in compliance with the invention.

BRIEF DESCRIPTION OF THE FIGURES

Refer to the appended drawings on which.

DETAILED DESCRIPTION OF THE INVENTION

Figure 1:
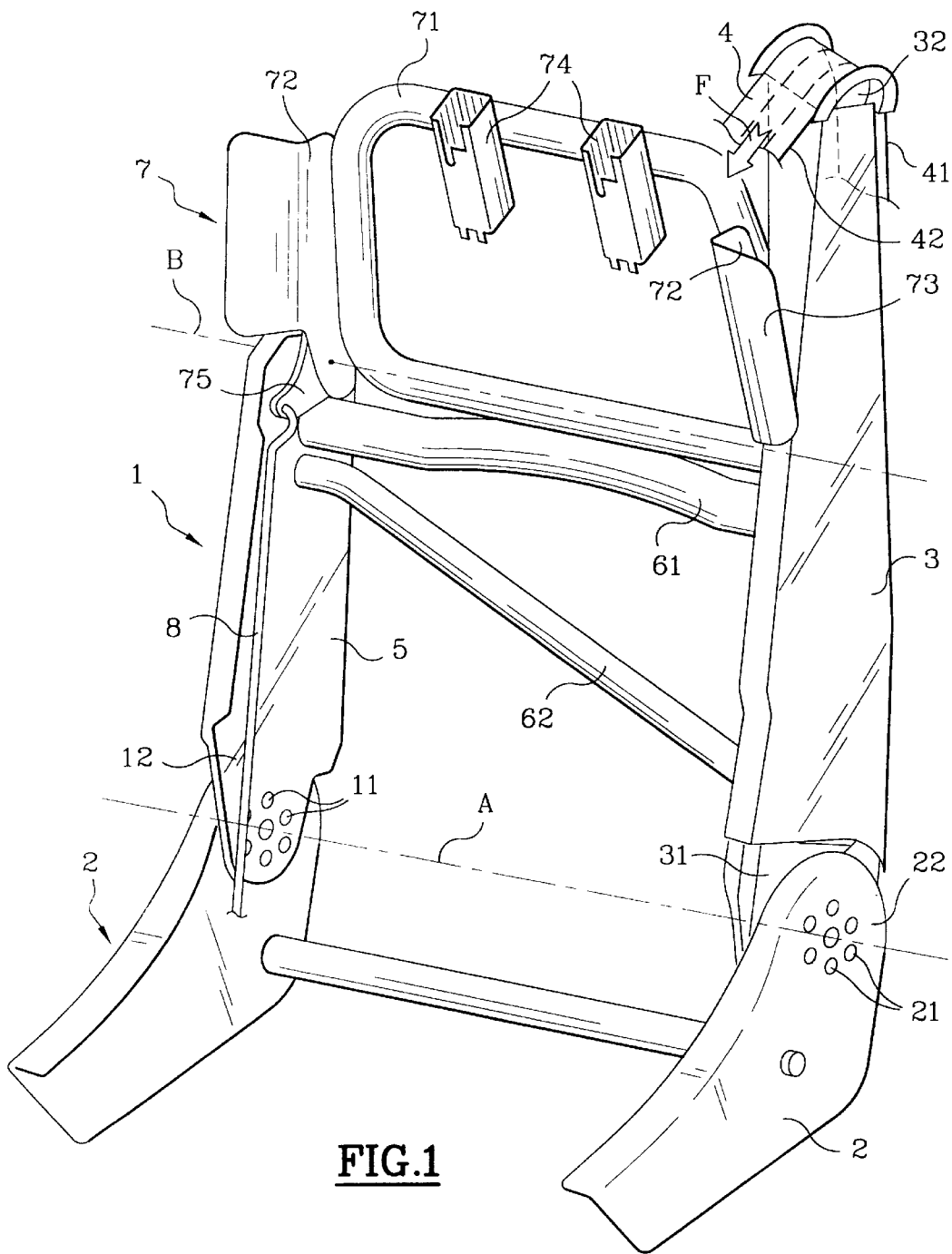
FIG. 1 is a perspective view of a backrest framework according to a first design with a single upright capable of supporting the seat belt attachment.

The drawing on FIG. 1 shows an overall view of the backrest framework 1 installed on a seat pan framework 2 which is partially represented. The connection between these two frameworks is made in a conventional manner, by adjustable hinge systems, allowing for the pivoting of the backrest in relation to the seat pan around a horizontal axis A. These hinge systems, known themselves, are not shown on FIG. 1 where only the studs 21 attaching a hinge system onto a flange 22 of the seat pan framework and the studs 11 attaching the hinge mechanism onto the flange 12 of the backrest framework are shown.

The backrest framework includes, on the lefthand side (that is on the right of the sheet), an upright 3 consisting of a beam made for instance from stamped sheet. The beam 3 is terminated at the bottom by a flange 31 to which the hinge mechanism is attached.

The upper end of the beam 3 is shaped to form a semi-cylindrical guide 32, adapted to take a seat belt strap and to change the direction of this belt as shown by the chain-line 4. As no doubt already understood, the web portion 41 of the belt extends downwards at the rear of the beam 3 to the inertia reel, not shown, located either in the backrest or in the seat pan, and the web portion 42, restrains the chest of the passenger by passing over his or her shoulder. The loads exerted by the belt on the upright 3 are therefore, in the case of a shock and on account of the locking of the belt by the self-winding reel, indicated by F directed in the direction of the belt and have therefore a high horizontal component tending to bend the upright.

The other upright 5 of the backrest is shorter than the upright 3 to which it is connected by an upper horizontal tubular cross member 61 and a diagonal cross member 62, these cross members ensuring the rigidity of the framework in the transverse direction.

The framework of the upper section of the backrest consists of a chassis 7, installed so as to pivot around a horizontal axis B, between the two uprights 3 and 5, axis B being located towards the upper end of the shorter upright 5. The chassis 7 includes a center section consisting of a frame 71 made, for instance, from a bent tube, and two lateral lugs 72 attached, for instance, by welding to the sides of the frame 71. The two lugs include, near their lower ends, conventional-type hinge means, not shown, enabling the pivoting of the chassis 7 around axis B. The lugs 72, made for instance of bent sheet metal, are shaped so that a lateral section 73 extends more or less in the general plane of the backrest. The lateral section 73 of the lug located on beam 3 side covers the front face of this beam which especially enables the pivoting of the upper section of the backrest to be limited towards the rear.

Moreover, the sockets 74, designed to accommodate the headrest pin guide means (not shown), are attached to the upper edge of the frame 71, for instance, by welding.

The adjustment of the angular position of the chassis 7 is controlled by a control rod 8 which extends along the upright 5 and which is connected to a lug 75 of the chassis. The other end of the rod 8 is connected to control means, not shown, actuated by the seat user, or to the seat pan framework connecting means, to automatically adjust the position of the chassis 7 according to the inclination of the backrest in relation to the seat pan.

Figure 2:
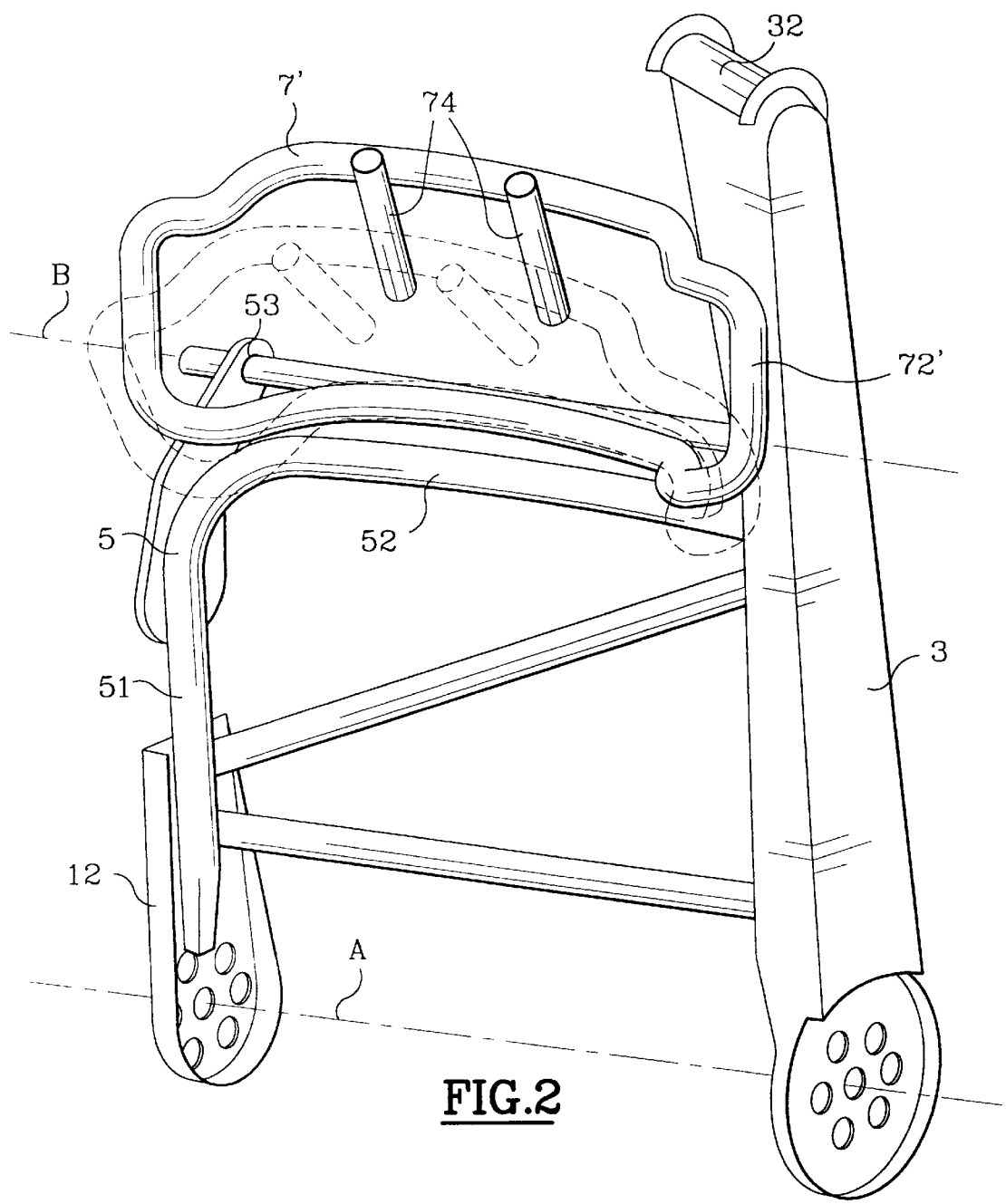
FIG. 2 is a simplified view of a variant of this first design.
Figure 3:
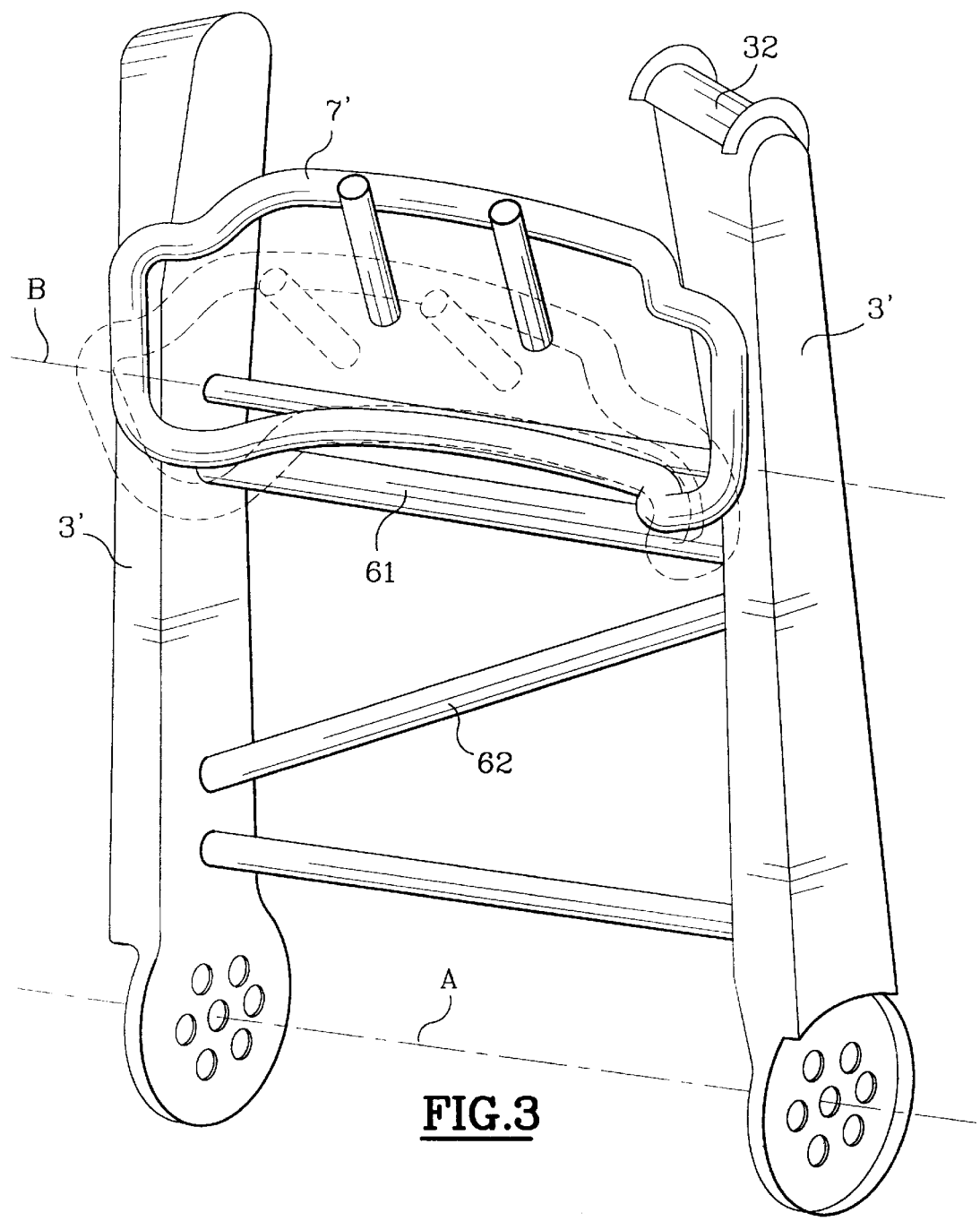
FIG. 3 is a perspective view of a backrest framework according to a second design.

The drawing on FIG. 2 shows a design variant of the framework, where the chassis 7 forming the framework of the upper section of the backrest is completely made from a bent tube 7'. On the drawing on FIG. 2, the positional adjustment means have not been shown but the chassis is drawn in maximum rearward pivoting position, the tube section 72' bearing against the beam 3, and in a forward pivoting position, shown by the dotted lines. In this variant, the shorter upright 5 consists of a tube 51 attached to the flange 12 of the hinge, this tube being bent to form a connecting cross member 52 connected to the beam 3 and an upper flange 53 is welded to the tube 51 to act as support for the hinge of the chassis In the design on FIG. 3, the two uprights of the framework consist of symmetrical beams 3' connected together by the cross members 61 and 62. The chassis of the upper section of the backrest is the same as the chassis of the previous variant and is hinged on each side on the said beams. The positional adjustment could be achieved by means equivalent to those described in the first design.

The invention is not limited to the designs described above only as examples. In particular, the headrest could be integrated to the upper section of the backrest, the shape of the frame of the backrest being then adapted to suit so as to form a common framework at the top of the backrest and at the headrest.

What is claimed is:

1. A vehicle seat frame assembly comprising:
    two lateral upright side members;
    brace means connected between the upright side members to form a lower backrest frame;
    at least one of the upright side members having an upper end and being rigid from a bottom of the lower backrest frame to the upper end, the upper end further including a point for attaching or passing a seat belt;
    an upper backrest frame located above the lower backrest frame and positioned below the upper end of the at least one upright side member; and
    means for pivotally mounting the upper backrest frame at a lower edge thereof to the upright side members for allowing pivotal movement of the upper backrest frame relative to the lower backrest frame.

2. The vehicle seat frame assembly of claim 1 wherein a second upright side member has an upper end and is rigid from the bottom of the lower backrest frame to its upper end, its upper end further including a point for attaching or passing a seat belt.

3. The vehicle seat frame assembly of claim 2 further comprising a pair of lugs secured to the upper backrest frame and extending forwardly of the upright side members.

4. The vehicle seat frame assembly of claim 1 further comprising a pair of lugs secured to the upper backrest frame and extending forwardly of the upright side members.

5. The vehicle seat frame assembly of claim 1 wherein headrest supports are mounted to an upper edge of the upper backrest frame.

6. The vehicle seat frame assembly of claim 1 further comprising:
   hinge means for selectively inclining the lower backrest frame relative to a seat pan; and
   adjustment means connected between the seat pan and the upper backrest frame for automatically adjusting the position of the upper backrest frame in response to a change of inclination of the lower backrest frame.

7. The vehicle seat frame assembly of claim 1 wherein the brace means connected between the upright side members includes at least one stiffener cross member.

\* \* \* \* \*

UNITED STATES PATENT AND TRADEMARK OFFICE
CERTIFICATE OF CORRECTION

PATENT NO. : 6,082,823
DATED : July 4, 2000
INVENTOR(S) : Jean-Claude Aumont et al.

It is certified that error appears in the above-indentified patent and that said Letters Patent is hereby corrected as shown below:

Title page:

Assignee (Section 73) is misspelled; "Equipments" should read --Equipements--.

Signed and Sealed this

Third Day of April, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO.    : 6,082,823
DATED         : July 4, 2000
INVENTOR(S)   : Jean-Claude Aumont et al.

It is certified that error appears in the above-identified patent and that said Letters Patent is hereby corrected as shown below:

<u>Title page,</u>
Item [73], Assignee, delete "Betrand" and insert -- Bertrand --

Signed and Sealed this

Twenty-third Day of December, 2003

JAMES E. ROGAN
*Director of the United States Patent and Trademark Office*